(12) United States Patent
Bagwell et al.

(10) Patent No.: US 11,346,993 B1
(45) Date of Patent: May 31, 2022

(54) MICRO-LENSED FIBER OPTIC PLATE AND METHODS OF FORMING THEREOF

(71) Applicant: National Technology & Engineering Solutions of Sandia, LLC, Albuquerque, NM (US)

(72) Inventors: Brett Bagwell, Albuquerque, NM (US); Jeremy Benjamin Wright, Albuquerque, NM (US); Jayson Briscoe, Albuquerque, NM (US); Erika C. Vreeland, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 0 days.

(21) Appl. No.: 17/228,957

(22) Filed: Apr. 13, 2021

Related U.S. Application Data (60) Provisional application No. 63/013,572, filed on Apr. 22, 2020.

(51) Int. Cl.
  *F21V 8/00* (2006.01)
  *G02B 6/08* (2006.01)
  *G02B 6/36* (2006.01)

(52) U.S. Cl.
  CPC .............. *G02B 6/003* (2013.01); *G02B 6/08* (2013.01); *G02B 6/3692* (2013.01)

(58) Field of Classification Search
  CPC .................................. G02B 6/003; G02B 6/08
  See application file for complete search history.

(56) References Cited

U.S. PATENT DOCUMENTS

| | | | |
|---|---|---|---|
| 7,091,492 B2 | 8/2006 | Moonen | |
| 8,308,329 B1 | 11/2012 | Sethna | |
| 8,355,609 B2 | 1/2013 | Popp et al. | |
| 10,146,009 B2 | 12/2018 | Badihi et al. | |
| 2004/0190851 A1 | 9/2004 | Garner et al. | |
| 2016/0062114 A1* | 3/2016 | Amarilio | G02B 27/0179 359/613 |
| 2021/0019017 A1* | 1/2021 | Yeke Yazdandoost | G06V 40/1318 |

* cited by examiner

*Primary Examiner* — Joseph L Williams
(74) *Attorney, Agent, or Firm* — Samantha Updegraff; Medley, Behrens & Lewis, LLC (57) ABSTRACT

A method of forming a micro-lensed fiber optic plate. The method includes obtaining a fiber optic plate that has a plurality of fibers arranged in parallel. A first end of a fiber of the plurality of fibers can have a first numerical aperture. The fiber of the plurality of fibers includes a core material running along a length of the fiber that is circumscribed by a layer of cladding material. The method also includes creating a lensed surface at a second end of the fiber of the plurality of fibers. The second end is opposite the first end. The lensed surface of the fiber of the plurality of fibers can have a second numerical aperture that is different from the first numerical aperture.

20 Claims, 9 Drawing Sheets

MICRO-LENSED FIBER OPTIC PLATE AND METHODS OF FORMING THEREOF

RELATED APPLICATION

This application claims priority to U.S. Provisional Patent Application No. 63/013,572 filed on Apr. 22, 2020 and entitled "MICRO-LENSED FIBER OPTIC PLATE", the entirety of which is incorporated herein by reference.

STATEMENT OF GOVERNMENTAL INTEREST

This invention was made with Government support under Contract No. DE-NA0003525 awarded by the United States Department of Energy/National Nuclear Security Administration. The U.S. Government has certain rights in the invention.

BACKGROUND

Fiber optic plates (FOPs) are optical devices that consist of a bundle of individual fibers made into a planar optic. Light is conveyed through the optical fibers via total internal reflection from one side of the plate to the other. Typically, a highly resolved FOP exhibits a large numerical aperture (NA). NA exceeding 0.5 (F/#=1.0) are typical. A high NA can be desirable for coupling light into the FOP but can cause light loss when attempting to couple light at the output of the fiber optic plate.

SUMMARY

The following is a brief summary of subject matter that is described in greater detail herein. This summary is not intended to be limiting as to the scope of the claims.

In an exemplary embodiment, described herein is a method for forming a micro-lensed FOP that has separate numerical apertures at an input to the FOP and an output from the FOP. The method comprises obtaining a FOP that comprises a plurality of fibers that can be arranged in parallel. A first end of a fiber of the plurality of fibers can have a first numerical aperture. The fiber comprises a core material running along a length of the fiber that is circumscribed by a layer of cladding material. The method further comprises creating a lensed surface on a second end of the fiber. This lensed surface has a second numerical aperture that is different from the first numerical aperture. By decoupling the first numerical aperture and the second numerical aperture, the micro-lensed FOP can limit the light loss that occurs with conventional FOPs.

In one embodiment, the lensed surface is created by etching a portion of the cladding material at the second end of the fiber to expose a portion of the core material and melting the exposed portion of the core material to form the lensed surface. In another embodiment, the lensed surface is created by applying (e.g., spin coating, spraying, roller coating, dip coating, or the like) a photoresist material on a face of the second end of the fiber, and passing light through the fiber (e.g., from the first end of the fiber to the second end of the fiber) to chemically alter portions of the photoresist material that are exposed to the light. The light can be coupled to the FOP such that the light travels through the core material and does not travel through the cladding material. The unaltered portions of the photoresist material are then removed (e.g., by application of a photoresist developer to the photoresist material) and the lensed surface is created by melting or etching the remaining portions of the photoresist material.

In a further embodiment, the method of forming the micro-lensed FOP includes forming a cupped structure at the second end of the fiber and placing a ball lens in the cupped structure. The ball lens then comprises the lensed surface. In one version, the cupped structure is formed by etching a portion of the core material at the second end of the fiber to expose a portion of the cladding material. In another version, the cupped structure is formed by applying a photoresist material on a face of the second end of the fiber. Light is passed through the fiber to chemically alter portions of the photoresist material exposed to the light. The light is coupled into the fiber such that the light travels through the core material and not through the cladding material. The altered portions of the photoresist material are soluble in a photoresist developer and are then removed to form the cupped structure.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Various technologies pertaining to a method for forming a micro-lensed FOP are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details.

In reference to the disclosure herein, for purposes of convenience and clarity only, directional terms, such as, top, bottom, left, right, up, down, upper, lower, over, above, below, beneath, rear, and front, may be used. Such directional terms should not be construed to limit the scope of the features described herein in any manner. It is to be understood that embodiments presented herein are by way of example and not by way of limitation. The intent of the following detailed description, although discussing exemplary embodiments, is to be construed to cover all modifications, alternatives, and equivalents of the embodiments as may fall within the spirit and scope of the features described herein.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Additionally, as used herein, the term "exemplary" is intended to mean serving as an illustration or example of something and is not intended to indicate a preference.

Figure 1:
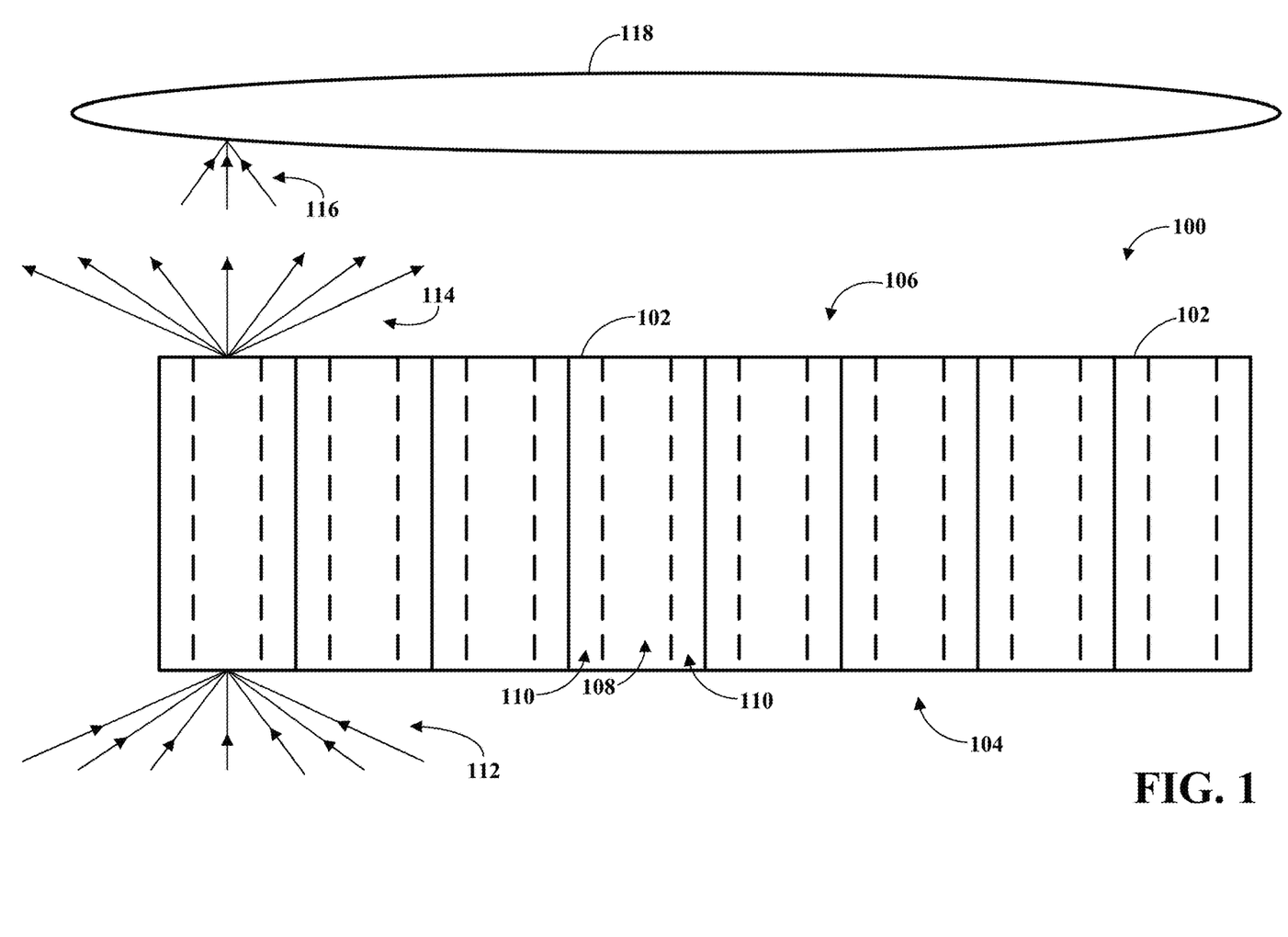
FIG. 1 illustrates a FOP coupled to a conventional lens at the output of the FOP.

Illustrated in FIG. 1 is a FOP 100. The FOP 100 comprises a plurality of individual fibers 102 that are arranged in parallel to convey light from a first side 104 to a second side 106 of the FOP 100. In the illustrated embodiment, each fiber 102 can comprise a core material 108 that is circumscribed by a cladding material 110. However, any suitable material(s) is envisioned for making each fiber 102 of the FOP 100.

The light is conveyed from the first side 104 to the second side 106 via total internal reflection within each fiber. In various embodiments, a highly resolved FOP 100 exhibits a large numerical aperture (NA) which can be desirable for coupling light into the FOP 100. This can be seen by large amount of light, indicated by reference numeral 112, entering the FOP 100 at the first side 104.

However, this high NA can result in light loss when attempting to couple light at an output of the FOP 100. More particularly, in order to prepare the light from the FOP 100 for presentation to a human eye or an optical detector, a lens 118 with a smaller NA than the FOP 100 is placed near the output (e.g., the second side 106) of the FOP 100 to collimate the light exiting the FOP, indicated by reference numeral 114. The NA of each of the fibers 102 is determined by construction of the fibers (e.g., relative indices of refraction of the core material 108 and cladding material 110), and is the same at the input to the fibers 102 (e.g., the first side 104 of the FOP 100) as at the output of the fibers 102 (e.g., the second side 106 of the FOP 100). Because of the smaller NA of the collimating lens 118, only a portion of the light 114 exiting the FOP 100 enters the collimating lens 118, resulting in loss of light. As can be seen in FIG. 1, losses in the FOP 100 are low such that an amount light 114 exiting from the FOP 100 is substantially the same as the amount of light 112 entering the FOP 100 but only a relatively small portion of that light 114 then enters the lens 118, the relatively small portion indicated by reference numeral 116. This lost light can inhibit the performance of an optical system that incorporates the FOP 100.

In the following embodiments, in order to overcome this inefficiency of the current FOP system for FOPs with relatively small fibers (e.g., diameters less than 20 µm), a FOP is created where NA of a first side of the FOP (e.g., an input side) remains high to couple the light into the FOP and NA of an opposing second side of the FOP (e.g., an output side) is modified to be different from the NA of the first side to limit light loss at the output of the FOP. More particularly, a micro-lensed FOP is created with a lensed surface at a second end of a fiber to modify the NA of the second end of the fiber. The lensed surface is designed to modify a shape of light exiting the FOP 100. Different methods and techniques are now described for creating the lensed surface at the second end of the fiber.

Figure 2A:
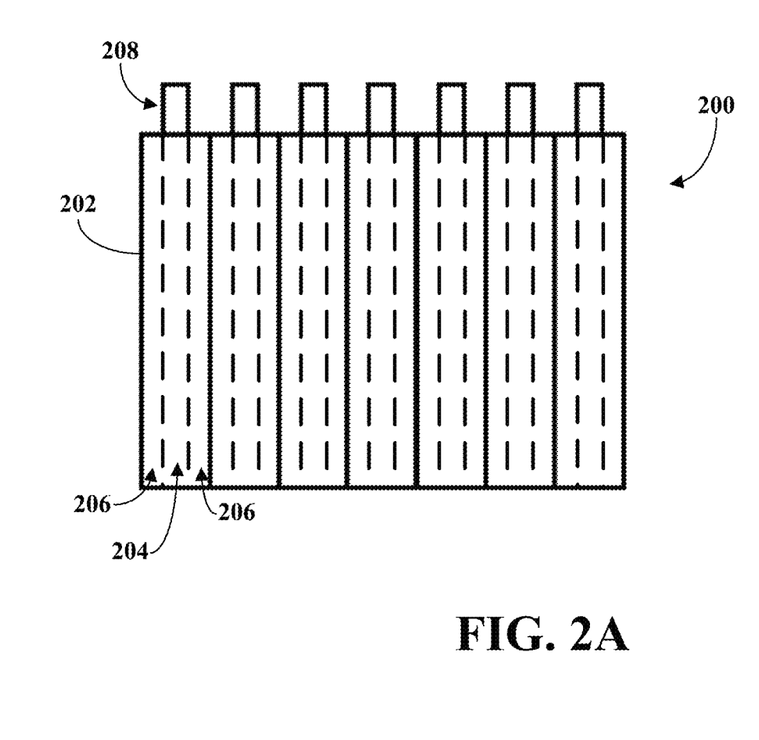
FIGS. 2A and 2B illustrate an exemplary method for forming a micro-lensed FOP.
Figure 2B:
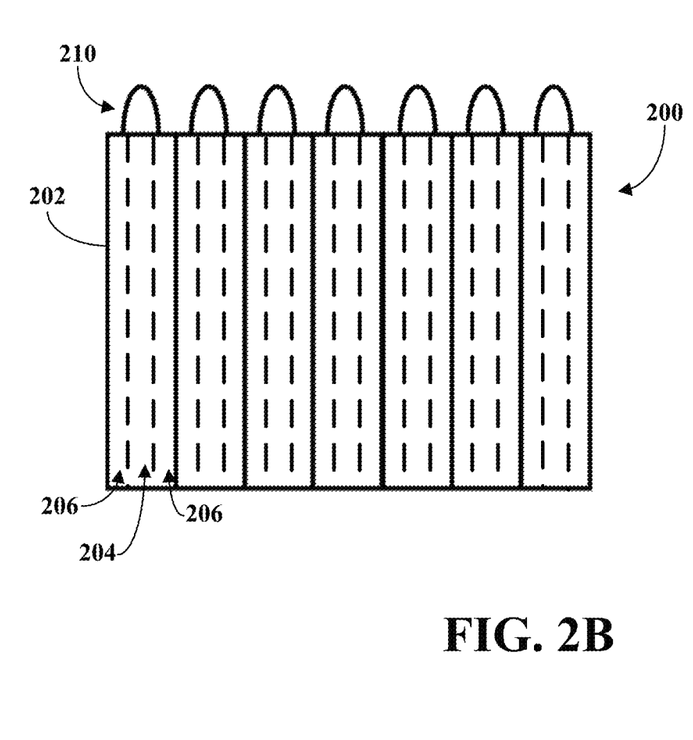

Turning to FIGS. 2A and 2B, illustrated is a first method that comprises forming a post at a second end of a fiber and modifying the post to form the lensed surface. In the illustrated embodiments, the method includes exposing a portion of core material of the fiber and then melting and/or etching the exposed portion to form the lensed surface. In a first step, illustrated in FIG. 2A, a FOP 200 can be modified or formed to expose a portion of core material of a fiber in the FOP 200. In the illustrated embodiment, each individual fiber is modified or formed to expose an equal portion of their respective core material. However, any suitable portion of core material may be exposed, and the amount may vary between individual fibers. For instance, a first portion may be exposed for a first fiber and a different second portion may be exposed for a second fiber. Moreover, any suitable number of fibers can be modified or formed to expose a portion of their respective core material, such as every fiber (as illustrated) and/or a portion thereof.

A method of exposing the portion of the core material and forming the lensed surface will be described with reference to a first fiber 202, but the same method and/or a similar method can be used for each fiber in the FOP 200. As can be seen in FIG. 2A, the first fiber 202 comprises a core material 204 that is circumscribed by a cladding material 206. For example, the core material 204 can be formed as a substantially cylindrical element, and the cladding material 206 can be formed as a hollow cylinder with the core material 204 disposed therein. In order to expose a portion 208 of the core material 204, a corresponding portion of the cladding material 206 is removed. The portion of the cladding material 206 can be removed by any suitable method that leaves the exposed portion 208 of the core material 204 intact, such as wet etching, or reactive ion etching. In connection with etching of the cladding material 206, a masking layer (not shown) can be used to protect portions of the core material 204 that are not to be etched.

The exposed portion 208 of the core material 204 can then be modified to form the lensed surface 210 illustrated in FIG. 2B. In the illustrated embodiment, the lensed surface 210 comprises a parabolic shape. In one embodiment, the modification can comprise melting the exposed portion 208 via rapid thermal annealing, and then cooling the exposed portion 208 to have a desired shape. In another embodiment, the modification can comprise additional etching that is performed on the exposed portion 208, such as chemical etching.

Figures 3A, 3B, 3C:
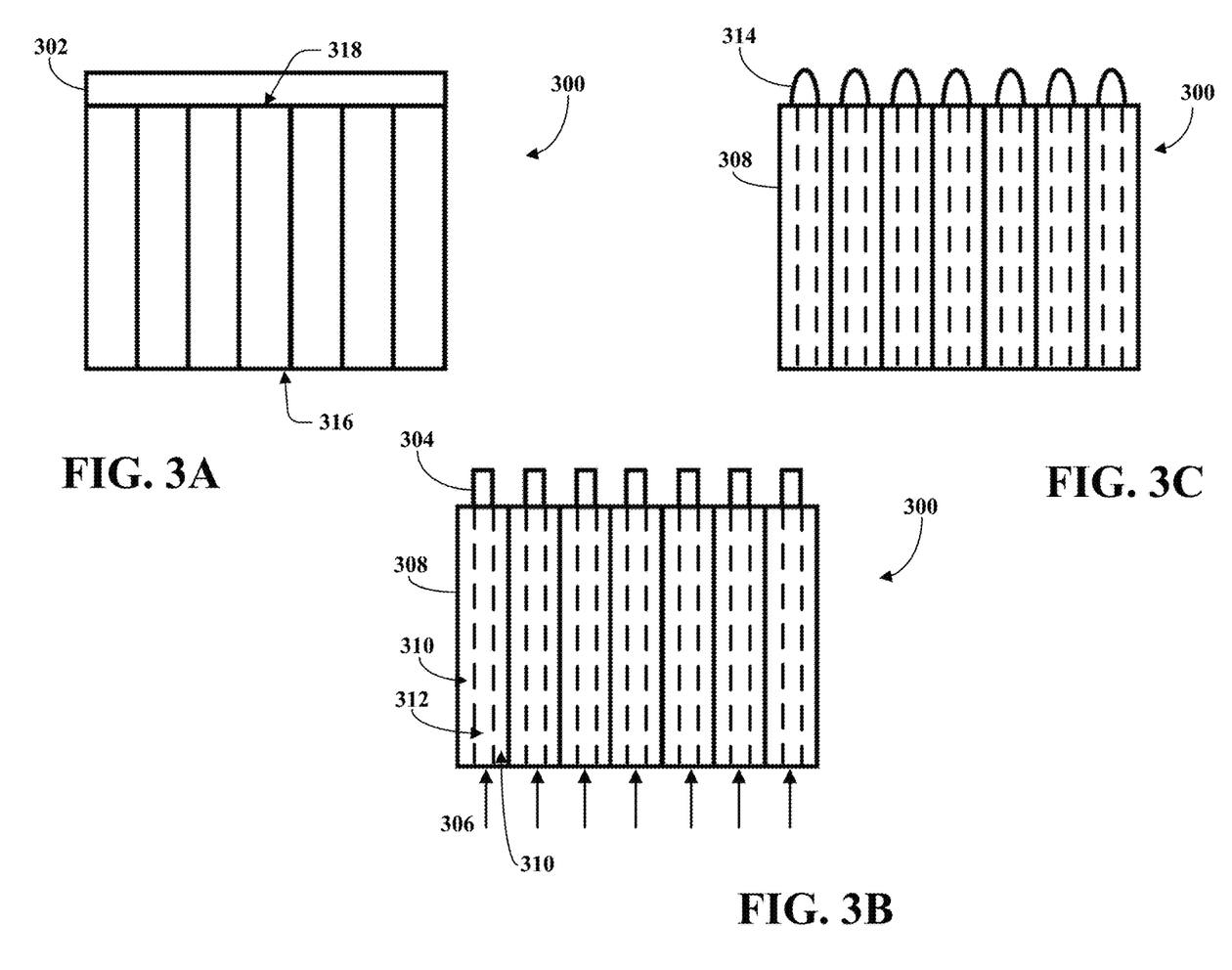
FIGS. 3A-3C illustrate another exemplary method for forming a micro-lensed FOP.

Turning now to FIGS. 3A-3C, illustrated is another embodiment that comprises forming a post at a second end of a fiber and modifying the post to form the lensed surface. As can be seen in FIG. 3A, a FOP 300 has a first side 316 and a second side 318. For instance, the first side 316 can be an input side of the FOP 300 and the second side 318 can be an output side of the FOP 300. A layer of photoresist 302 is applied to the second side 318 of the FOP 300. The layer of photoresist 302 can have even thickness across the second side 318 of the FOP 300 or the thickness can vary. In one embodiment, the photoresist 302 is spin coated onto the second side 318 of the FOP 300, but any suitable method for applying the photoresist 302 is contemplated. Any suitable photoresist 302 can be employed. For instance, the photoresist 302 can comprise AZ 5214E.

The layer of photoresist 302 can then be modified to form a post 304 illustrated in FIG. 3B. A method for forming a post 304 will now be described with respect to forming one post 304 and the same method can be used to form multiple posts. In the illustrated embodiment, light 306 (e.g., ultraviolet light and/or the like) is directed through a fiber 308 of the FOP 300 such that a portion of the photoresist layer 302 is exposed to the light 306. For example, the light 306 can be emitted through the fiber 308 from the first side 316 of the FOP 300 to the second side 318 of the FOP 300, on which the photoresist layer 302 is positioned. Portions of the photoresist layer 302 exposed to the light 306 are cross-linked. The light 306 can be patterned such that the light 306 is directed through core material 312 of the fiber 308 and not through cladding material 310 of the fiber 308. In some embodiments, the light 306 is configured such that the light 306 can propagate through the core material 312 but not the cladding material 310. For example, a wavelength of the light 306 can be selected such that the core material 312 is transparent to the light 306, but the cladding material 310 is non-transparent to the light 306.

Non-cross-linked portions of the photoresist layer 302 can then be removed to leave the pattern of posts shown in FIG. 3B. For instance, portions of the layer of photoresist 302 disposed above the cladding material 310 of the fibers of the FOP 300 can be removed (e.g., by way of a photoresist developer), leaving posts of photoresist material that are substantially conformal to boundaries of the core material 312 of each fiber of the FOP 300. Illuminating the photoresist layer 302 from the first side 316 of the FOP (i.e., the side of the FOP 300 opposite the side to which the photoresist layer 302 was applied) facilitates registration of the posts (e.g., the post 304) to the fibers (e.g., the fiber 308). Since the light 306 is transmitted through the fiber 308, the photoresist layer 302 is selectively chemically altered in a region that is substantially conformal to a profile of the fiber 308 on the second side 318 of the FOP 300. Thus, the post 304 can be centered about the core material 312 of the fiber 308. It can be difficult to ensure that a pattern of light used to cure the photoresist 302 is aligned to the fibers of the FOP 300 when the light is emitted toward the photoresist 302 from the same side of the FOP 300 that the photoresist 302 is deposited on, particularly if the photoresist 302 is non-transparent to visible light or the fibers of the FOP 300 are non-uniformly spaced. Emitting the light 306 from the opposite side of the FOP 300 (e.g., the first side 316) and through the fibers (e.g., the fiber 308) causes the photoresist 302 to be selectively cured in positions that are aligned to the fibers.

Once the post 304 is formed and the non-cross-linked material is removed, the post 304 can be modified to form a parabolic-shaped lensed surface 314 illustrated in FIG. 3C. Any suitable method can be used to modify the post 304 to form the lensed surface 314. For instance, the etching and/or melting process described above with respect to FIG. 2B can be employed to modify the post 304.

In some embodiments, the photoresist 302 can be selected to have desirable optical properties with respect to light that is intended to be propagated through the FOP 300. For example, the photoresist 302 can be composed of a photoresist material that is substantially transparent to wavelengths of light that are intended to be transmitted through the FOP 300 (e.g., in an operational environment of the FOP 300 subsequent to manufacturing). For example, if the FOP 300 is to be deployed as a component of an infrared (IR) sensor or other optical system, the photoresist 302 can be selected to be substantially transparent to IR light when the photoresist 302 is in its cured state.

Figure 4A:
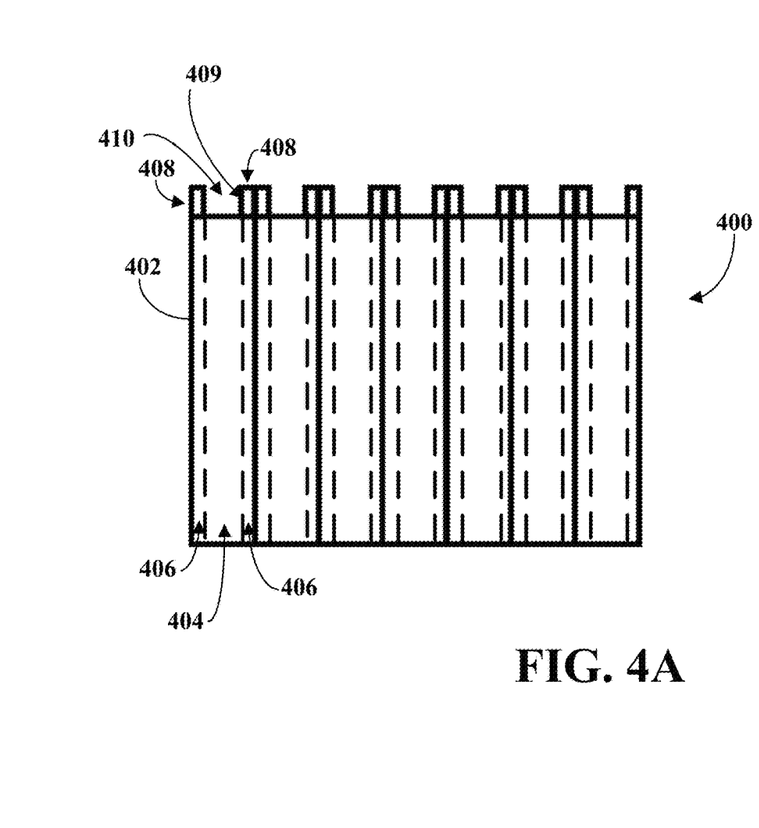
FIGS. 4A and 4B illustrate a further exemplary method for forming a micro-lensed FOP.
Figure 4B:
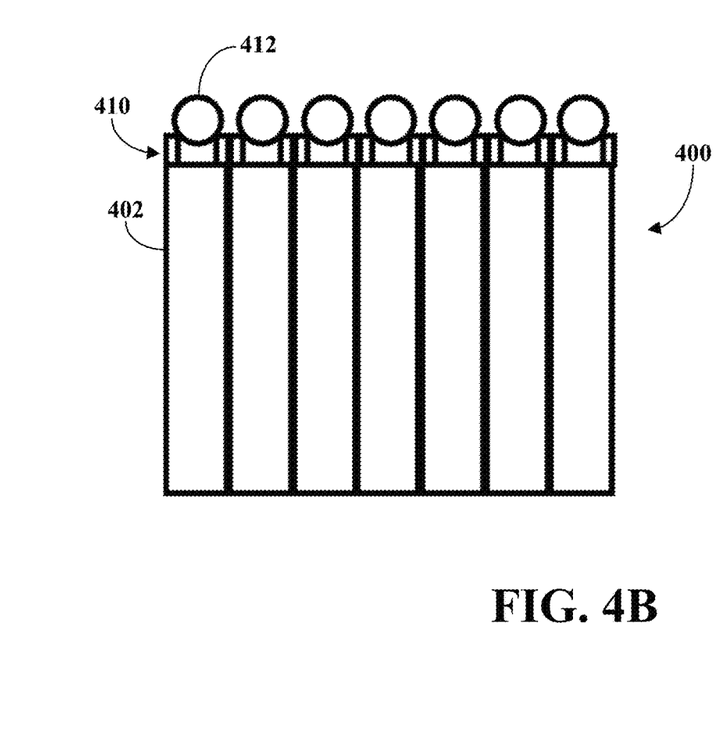

Turning now to FIGS. 4A and 4B, illustrated is a method that comprises forming a cupped structure at a second end of a fiber and placing a ball lens in the cupped structure to form the lensed surface. In the illustrated embodiments, the method includes exposing an inner surface of the cladding material of the fiber to create the cupping structure and then placing the ball lens in the cupped structure. In the illustrated embodiment, the cupped structure comprises the interaction between the exposed inner surface of the cladding material and the core material. In the illustrated embodiment, the cupped structure has a U-shaped cross-section, but any suitable cross-section for retaining the ball lens may be used.

In a first step, illustrated in FIG. 4A, in contrast to the method described above with respect to FIG. 2A where cladding material is etched away to expose a portion of core material, here a FOP 400 is modified by removing core material to expose a portion of an interior surface of the cladding material. In the illustrated embodiment, each fiber of the FOP 400 is modified to expose an equal portion of their respective inner surface of the cladding material. However, any suitable portion of inner surface of the cladding material may be exposed and the amount may vary between individual fibers. For instance, a first portion may be exposed for a first fiber and a different second portion may be exposed for a second fiber, such that a cupped structure positioned above the first fiber has a different height than a cupped structure positioned above the second fiber. Moreover, any suitable number of fibers can be customized to expose a portion of their respective inner surfaces of the cladding material, such as every fiber (as illustrated) and/or a portion thereof.

A method of exposing the portion of the inner surface of the cladding material to form the cupped structure and attaching a ball lens will be described with reference to a first fiber 402, but the same method and/or a similar method can be used for each fiber in the FOP 400. As can be seen in FIG. 4A, the fiber 402 comprises a core material 404 that is circumscribed by a cladding material 406. In order to expose a portion 408 of an inner surface 409 of the cladding material 406, a corresponding portion of the core material 404 is removed. The portion of the core material 404 can be removed by any suitable method, such as any of various etching processes. The resulting interaction between the exposed portion 408 of the inner surface 409 of the cladding material 406 and the remaining core material 404 forms the cupped structure 410.

Turning now to FIG. 4B, a ball lens 412 is placed in the cupped structure 410 and a portion of the ball lens 412 comprises the lensed surface of the FOP 400. The ball lens 412 can be any suitable size and the size may depend on the size of the cupped structure 410. For instance, the ball lens 412 may have a diameter of less than or equal to 6 μm and/or the cupped structure 410 may be shaped to accommodate a ball lens having a diameter of less than or equal to 6 μm. In exemplary embodiments, the ball lens can be formed from silicon dioxide.

The ball lens 412 can be placed in the cupped structure 410 via any suitable method. In one embodiment, drop casting is used where the ball lens 412 is suspended in a solution that is then dropped onto the FOP 400 and the ball lens 412 settles into the cupped structure 410, for instance via gravity forces causing the ball lens 412 to sink. The ball lens 412 may then be held in place in the cupped structure 410 via Van der Waal forces. In another embodiment, a chemical bond is established between the ball lens 412 and the cupped structure 410 to retain the ball lens 412 therein. For instance, a portion of the cupped structure 410 may be chemically functionalized, e.g., the portion of the cupped structure 410 is covered with organofunctional alkoxysilane molecules, and a portion of the ball lens 412 can be coated with a complementary chemical material to form an affinity interaction or covalent bond between the chemically functionalized portion of the cupped structure 410 and the complementary chemically functionalized portion of the ball lens 412.

Figure 5A:
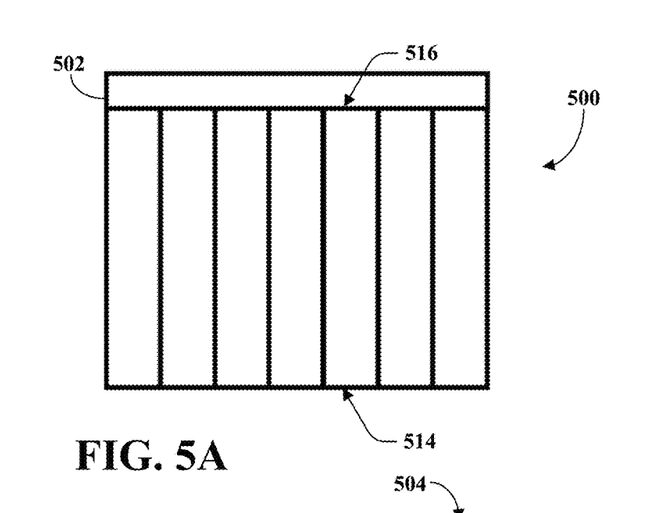
FIGS. 5A-5C illustrate yet another exemplary method for forming a micro-lensed FOP.
Figure 5B:
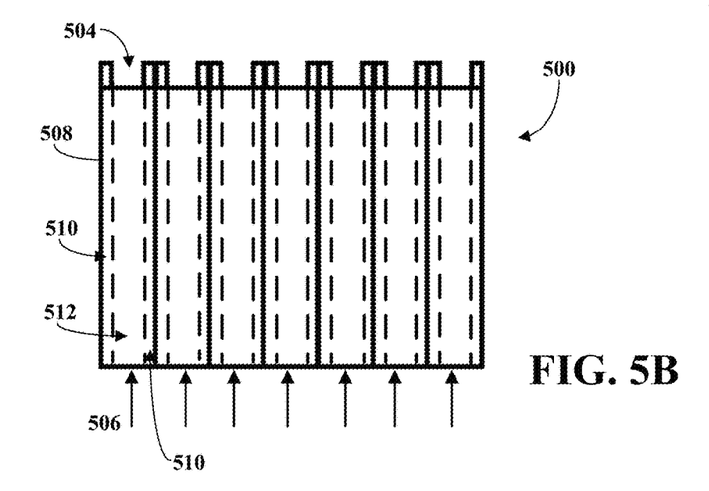
Figure 5C:
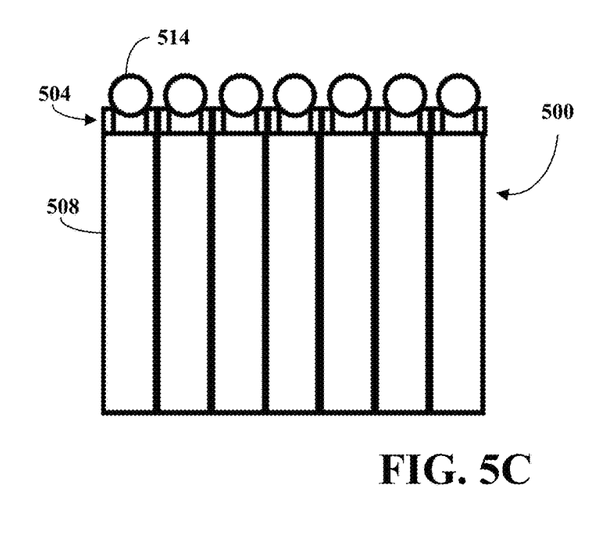

Turning now to FIGS. 5A-5C, illustrated is another method that comprises forming a cupped structure at a second end of a fiber and placing a ball lens in the cupped structure to form the lensed surface. In the illustrated embodiments, a second end of the fiber is coated with a photoresist, a portion of the photoresist is chemically altered and removed to form the cupped structure, and a ball lens is placed in the cupped structure. As can be seen in FIG. 5A, a FOP 500 has a first side 514 and a second side 516. A layer of photoresist 502 is applied to the second side 516 of the FOP 500. The layer of photoresist 502 can have even thickness across the second side 516 of the FOP 500 and/or the thickness can vary. In one embodiment, the photoresist 502 is spin coated onto the second side 516 of the FOP 500, but any suitable method for applying the photoresist 502 is contemplated. As described above with respect to FIG. 3, any suitable photoresist 502 can be employed. For instance, the photoresist 502 can comprise AZ 5214 E.

The layer of photoresist 502 can be modified to form the cupped structure 504 illustrated in FIG. 5B. A method for forming the cupped structure 504 will now be described with respect to forming one cupped structure 504 and the same method can be used to form multiple cupped structures. In the illustrated embodiment, light 506 (e.g., ultraviolet light and/or the like) is directed through a fiber 508 of the FOP 500 from the first side 514 of the FOP 500 to the second side 516 of the FOP 500 (i.e., the side on which the photoresist 502 is deposited) and portions of the photoresist layer 502 exposed to the light 506 are chemically altered. The light 506 can be patterned such that the light 506 is directed through core material 512 of the fiber 508 and not through cladding material 510 of the fiber 508. The chemically altered portion(s) of the photoresist 502 are soluble in a photoresist developer and can then be removed to leave the pattern of cupped structures shown in FIG. 5B. In other words, portions of the photoresist 502 disposed directly above the core material 512 are removed while portions of the photoresist 502 disposed directly above the cladding material 510 remain, thereby forming the cupped structure 504. In such embodiments, the photoresist 502 can be a positive photoresist. In other embodiments, the photoresist layer 502 can be illuminated from the same second side 516 of the FOP 500 that the photoresist layer 502 is deposited on in order to selectively cure the photoresist layer 502. In such embodiments, the photoresist layer 502 can be a positive photoresist or a negative photoresist, according to a pattern of the light that is employed.

Turning now to FIG. 5C, a ball lens 514 is then placed in the cupped structure 504. Similar to the description above with respect to FIG. 4B, any suitable method can be used for placing the ball lens 514 in the cupped structure 504, such as drop casting, Langmuir-Blodgett deposition, affinity interactions, or covalent attachment.

Figure 6A:
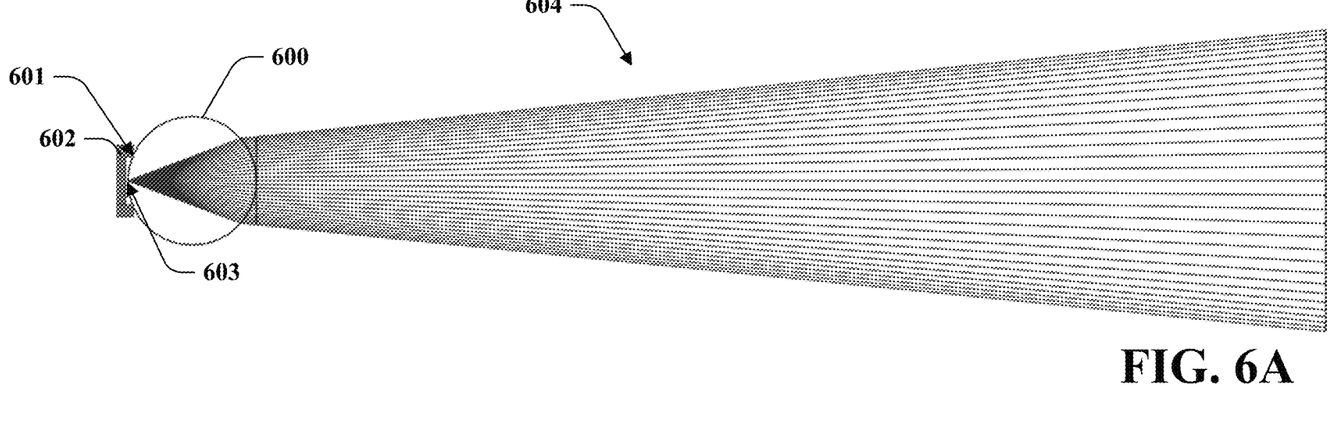
FIGS. 6A and 6B illustrate exemplary embodiments of light extending through ball lenses at different distances from an end of a fiber of a FOP.
Figure 6B:
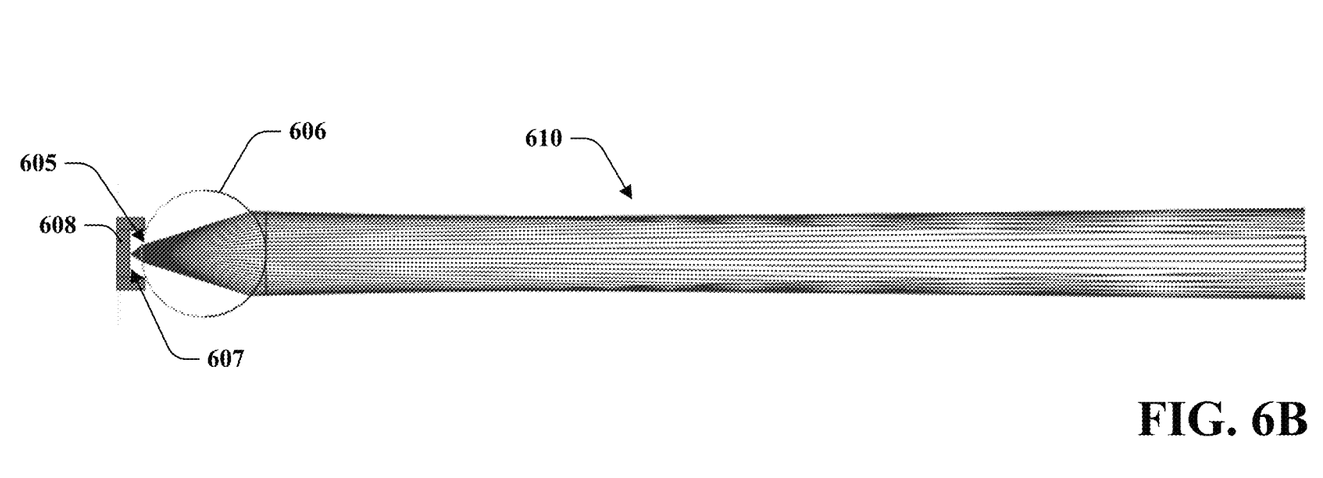

Turning now to FIGS. 6A and 6B, illustrated are embodiments of a ball lens in a cupped structure directing light that is exiting a fiber of a FOP. More particularly, the distance between a surface of the ball lens and the end of the fiber can impact how the ball lens directs the light. For instance, illustrated in FIG. 6A, is an embodiment where the surface 601 of a ball lens 600 is in contact with an end 603 of a fiber 602. This position of the ball lens 602 results in the light spread indicated by reference numeral 604. Whereas, illustrated in FIG. 6B, is an embodiment where a surface 605 of a ball lens 606 is spaced from an end 607 of a fiber 608, such that the end 607 of the fiber 608 and the surface 605 of the ball lens 606 are not in direct physical contact. This spacing results in the ball lens 606 collimating the light exiting the fiber 608 as indicated by reference numeral 610. From the foregoing it is to be appreciated that heights and/or widths or diameters of the cupped structures in the FOPs 400, 500 can be selected based upon a desired output profile of the light that will be transmitted through the FOPs 400, 500 in their respective operational environments. In embodiments wherein the cupped structures are formed from cladding of a fiber, the ends 603, 607 are exposed faces of the core material of the fibers.

Figure 7A:
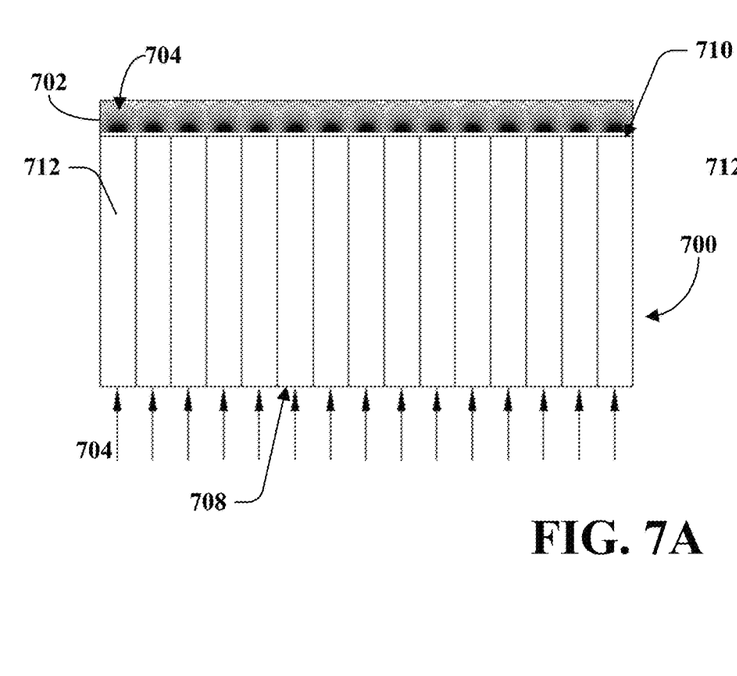
FIGS. 7A and 7B illustrate a yet further exemplary method for forming a micro-lensed FOP.
Figure 7B:
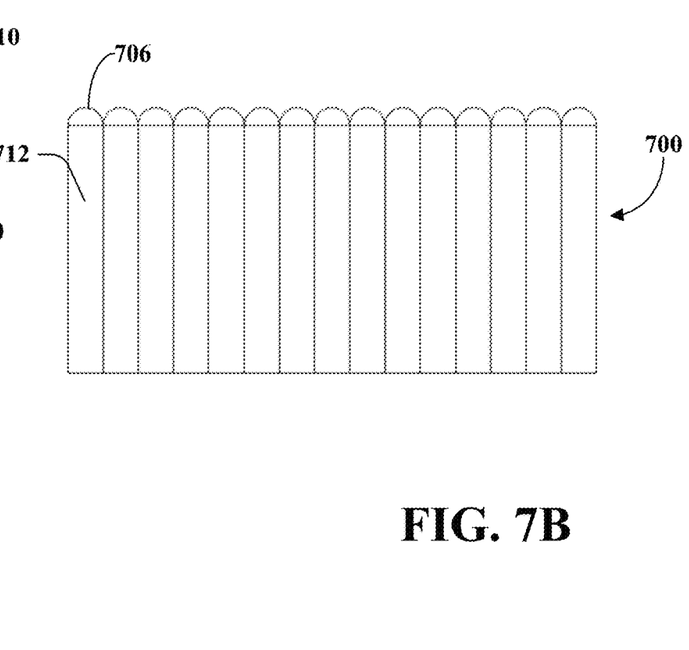

Turning now to FIGS. 7A and 7B, illustrated is yet another method of forming a lensed surface on a FOP 700, whereby a lensed surface is formed from a photoresist material. In the illustrated embodiment, the method includes applying a layer of photoresist on a side of the FOP 700 and using light to selectively chemically alter portions of the photoresist to form a lensed surface without modifying the photoresist via thermal reflow. The FOP 700 has a first side 708 and a second side 710. The FOP 700 includes a plurality of fibers, e.g., a fiber 712. As can be seen in FIG. 7A, a layer of photoresist 702 is applied to (e.g., spin coated on) the second side 710 of the FOP 700. Light 704 is passed through the fibers of the FOP 700 to chemically alter portions of the layer of photoresist 702 that are disposed above the fibers.

At the output of the fibers on the second side 710 of the FOP 700, intensity of the light 704 will change as the light 704 radiates outward from the second side 710. This spatially-variant irradiance profile can be used to form a curved lens surface 706 on each of the fibers on the second side 710 of the FOP 700, as illustrated in FIG. 7B. More particularly, as can be seen in FIG. 7A, as the light 704 exits the fiber 712 and enters the layer of photoresist 702, the light 704 radiates outward and the further out the light is from a center of the fiber 712 at the output of the fiber 712, the lower the irradiance. Because an extent of cross-linking in the photoresist 702 can be proportional to the energy imparted by the light, the lower the irradiance (i.e., the farther out from the center of a fiber core) the lower the extent of cross-linking in the photoresist 702. Accordingly, portions of the photoresist layer 702 that are farther from a center of a fiber core than other portions may exhibit less cross-linking, which can make those farther portions easier to etch than portions with greater cross-linking closer to the center of a fiber core. This difference in etching rates can provide the lensed surface 706 that has a parabolic shape centered about a center of the fiber 712.

Figure 8:
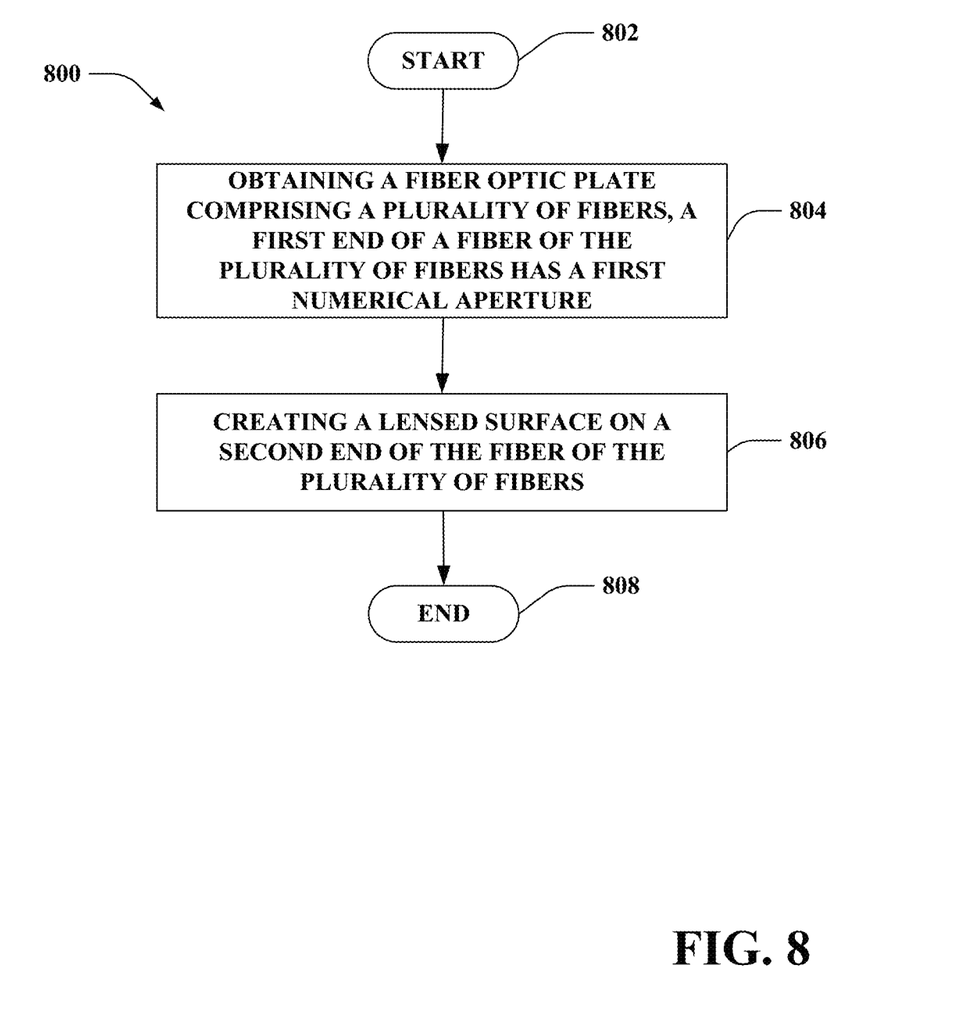
FIG. 8 is a flow diagram that illustrates an exemplary methodology for forming a micro-lensed FOP.
Figure 9:
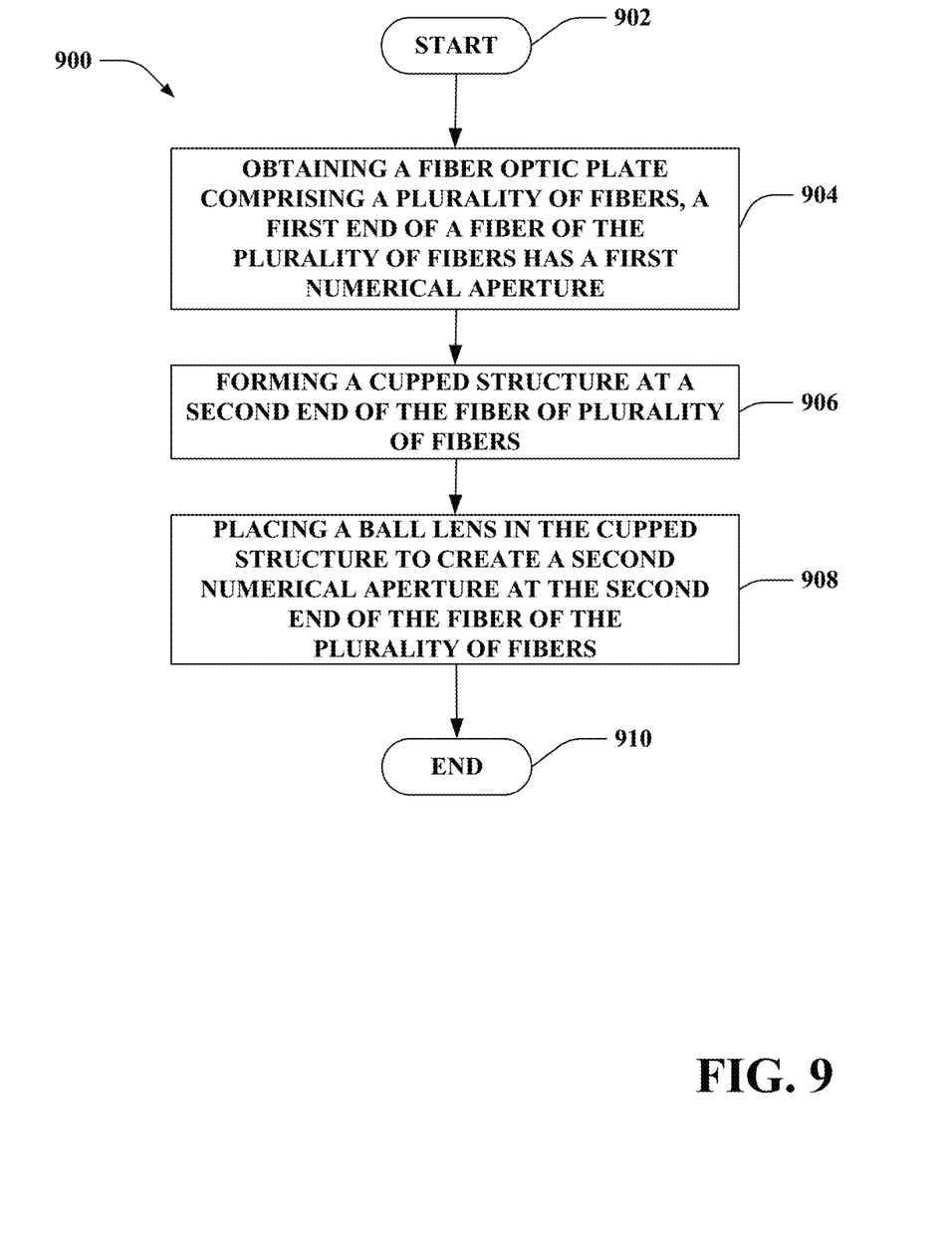
FIG. 9 is a flow diagram that illustrates another exemplary methodology for forming a micro-lensed FOP.

FIGS. 8 and 9 each illustrate an exemplary methodology relating to forming a micro-lensed FOP. While the methodologies 800 and 900 are shown as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Referring solely to FIG. 8, the methodology 800 starts at 802, and at 804, a FOP is obtained. The FOP can comprise a plurality of fibers arranged in parallel. A first end of a fiber of the plurality of fibers can have a first numerical aperture. The fiber of the plurality of fibers can comprise a core material running along a length of the fiber and that is circumscribed by a layer of cladding material. At step 806, a lensed surface is created on a second end of the fiber of the plurality of fibers. The second end is opposite the first end. The lensed surface of the fiber of the plurality of fibers can have a second numerical aperture. The first numerical aperture and the second numerical aperture can be different. The methodology 800 concludes at 808.

In an embodiment of the methodology 800, the step of creating the lensed surface comprises etching a portion of the cladding material at the second end of the fiber of the plurality of fibers to expose a portion of the core material. The step further comprises melting and then cooling the exposed portion of the core material to form the lensed surface.

In another embodiment of the methodology 800, the step of creating the lensed surface comprises spin coating a photoresist material on a face of the second end of the fiber of the plurality of fibers. The step further comprises passing light through the FOP from the first end of the fiber of the plurality of fibers to the second end of the fiber of the plurality of fibers. The light can chemically alter portions of the photoresist material exposed to the light. The light can further be configured to travel through the core material. The light can be yet further configured to not travel through the cladding material. The step additionally comprises removing unaltered portions of the photoresist material. The step yet further comprises forming the lensed surface by at least one of melting or etching the remaining portions of the photoresist material.

In yet another embodiment of the methodology 800, the step of creating the lensed surface comprises forming a cupped structure at the second end of the fiber of the plurality of fibers. The step further comprises placing a ball lens in the cupped structure, wherein the lensed surface comprises the ball lens.

In a version of this embodiment, the step of forming the cupped structure comprises etching a portion of the core material at the second end of the fiber of the plurality of fibers to expose a portion of the cladding material. The cupped structure can comprise the exposed portion of the cladding material.

In another version of this embodiment, the step of forming the cupped structure comprises applying a photoresist material on a face of the second end of the fiber of the plurality of fibers. The step additionally comprises passing light through the FOP from the first end of the fiber of the plurality of fibers to the second end of the fiber of the plurality of fibers. The light can chemically alter portions of the photoresist material exposed to the light. The light can be further configured to travel through the core material. The light can be yet further configured to not travel through the cladding material. The step yet further comprises removing the altered portions of the photoresist material.

In a further version of this embodiment, the step of placing the ball lens in the cupped structure comprises drop casting a solution that contains a plurality of ball lenses onto the cupped structure. Drop casting the solution can cause a ball lens of the plurality of ball lenses to settle into the cupped structure.

In a further version of this embodiment, a Langmuir-Blodgett trough is employed to deposit a monolayer of ball lenses onto the cupped structure. The lenses may be held in place in the structure by Van der Waals interactions or by utilizing affinity interactions or covalent bonds between the chemically reactive portion of the cupped structure and the chemically reactive ball lens.

In yet another version of this embodiment, the step of creating the lensed surface further comprises creating a chemically active portion of the cupped structure by attaching a functional chemical moiety to the portion of the cupped structure, such as alkoxysilane molecules containing terminal moieties such as —$NH_2$, —SH, —COOH, —OH. These moieties can be further functionalized with molecules such as biotin, streptavidin, functional polymers, etc. The step further comprises covering a portion of the ball lens with a complementary chemically reactive functionalization containing molecules such as —$NH_2$, —SH, —COOH, —OH. These moieties can be further functionalized with molecules such as biotin, streptavidin, functional polymers, etc. Placing the ball lens in the cupped structure can result in the immobilization of the ball lens in the cup by affinity interactions, such as those occurring between biotin and streptavidin, or the formation of a covalent bond, such as amide, ester, thioester, etc.

In another version of this embodiment, the step of placing the ball lens in the cupped structure comprises employing Langmuir-Blodgett deposition to deposit a monolayer of ball lenses onto the cupped structure.

In a yet further version of this embodiment, the cupped structure is shaped for registering a ball lens having a diameter of less than or equal to 6 µm.

In another embodiment of the methodology 800, the step of creating the lensed surface comprises rapid thermal annealing of a material to form the lensed surface on the second end of each fiber of the plurality of fibers.

In a further embodiment of the methodology 800, the step of creating the lensed surface comprises reactive ion etching of a material to form the lensed surface on the second end of each fiber of the plurality of fibers.

In yet another embodiment of the methodology 800, a first technique is employed to create the lensed surface on the second end of the fiber of the plurality of fibers. A second technique is employed to create a lensed surface on a second end of a second fiber of the plurality of fibers. The first technique and the second technique can be different.

The methodology 900 starts at 902, and at 904, a FOP is obtained. The FOP can comprise a plurality of fibers arranged in parallel. A first end of a fiber of the plurality of fibers can have a first numerical aperture. The fiber of the plurality of fibers can comprise a core material running along a length of the fiber that is circumscribed by a layer of cladding material. At 906, a cupped structure is formed at a second end of the fiber of the plurality of fibers, wherein the second end is opposite the first end. At 908, a ball lens is placed in the cupped structure. A diameter of the ball lens can be less than or equal to 6 µm. The ball lens can be registered to an optical axis of the fiber of the plurality of fibers to result in a second numerical aperture that is different from the first numerical aperture.

In an embodiment of the methodology 900, the step of forming the cupped structure comprises etching a portion of the core material at the second end of the fiber of the plurality of fibers to expose a portion of the cladding material. The cupped structure can comprise the exposed portion of the cladding material.

In another embodiment of the methodology 900, the step of forming the cupped structure comprises spin coating a photoresist material on a face of the second end of the fiber of the plurality of fibers. The step further comprises passing light through the FOP from the first end of the fiber of the plurality of fibers to the second end of the fiber of the plurality of fibers. The light can chemically alter portions of the photoresist material exposed to the light. The light can be further configured to travel through the core material. The light is yet further configured to not travel through the cladding material. The step yet further comprises removing the altered portions of the photoresist material.

In a further embodiment, the methodology 900 further comprises chemically functionalizing a portion of one of the cupped structures to cover the portion of the cupped structure, such as with organofunctional alkoxysilane molecules. The methodology 900 yet further comprises covering a portion of one of the ball lenses with a complementary chemical material. Placing the ball lens in the cupped structure comprises forming an affinity interaction or covalent bond between the organofunctional alkoxysilane molecules on the portion of the cupped structure and the functional chemical material on the portion of the ball lens.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of forming a micro-lensed fiber optic plate comprising:
   obtaining a fiber optic plate, wherein the fiber optic plate comprises a plurality of fibers arranged in parallel, wherein a first end of a fiber of the plurality of fibers has a first numerical aperture, wherein the fiber of the plurality of fibers comprises a core material running along a length of the fiber that is circumscribed by a layer of cladding material; and
   creating a lensed surface at a second end of the fiber of the plurality of fibers, wherein the second end is opposite the first end, wherein the lensed surface of the fiber of the plurality of fibers has a second numerical aperture, wherein the first numerical aperture and the second numerical aperture are different.

2. The method of claim 1, wherein creating the lensed surface comprises:
   etching a portion of the cladding material at the second end of the fiber of the plurality of fibers to expose a portion of the core material; and
   melting the exposed portion of the core material to form the lensed surface.

3. The method of claim 1, wherein creating the lensed surface comprises:
   applying a photoresist material on a face of the second end of the fiber of the plurality of fibers;
   passing light through the fiber optic plate from the first end of the fiber of the plurality of fibers to the second end of the fiber of the plurality of fibers, wherein the light chemically alters portions of the photoresist material exposed to the light, wherein the light is further configured to travel through the core material, wherein the light is yet further configured to not travel through the cladding material;
   removing unaltered portions of the photoresist material; and
   forming the lensed surface by at least one of melting or etching the remaining portions of the photoresist material.

4. The method of claim 1, wherein creating the lensed surface comprises:
   forming a cupped structure at the second end of the fiber of the plurality of fibers; and
   placing a ball lens in the cupped structure, wherein the lensed surface comprises the ball lens.

5. The method of claim 4, wherein forming the cupped structure comprises etching a portion of the core material at the second end of the fiber of the plurality of fibers to expose a portion of the cladding material, wherein the cupped structure comprises the exposed portion of the cladding material.

6. The method of claim 4, wherein forming the cupped structure comprises:
   applying a photoresist material on a face of the second end of the fiber of the plurality of fibers;
   passing light through the fiber optic plate from the first end of the fiber of the plurality of fibers to the second end of the fiber of the plurality of fibers, wherein the light chemically alters portions of the photoresist material exposed to the light, wherein the light is further configured to travel through the core material, wherein the light is yet further configured to not travel through the cladding material; and
   removing the altered portions of the photoresist material.

7. The method of claim 4, wherein placing the ball lens in the cupped structure comprises drop casting a solution that contains a plurality of ball lenses onto the cupped structure, wherein the drop casting the solution causes a ball lens of the plurality of ball lenses to settle into the cupped structure.

8. The method of claim 4, wherein placing the ball lens in the cupped structure comprises employing Langmuir-Blodgett deposition to deposit a monolayer of ball lenses onto the cupped structure.

9. The method of claim 4, wherein creating the lensed surface further comprises:
   chemically functionalizing a portion of the cupped structure to cover the portion of the cupped structure, wherein chemically functionalizing the portion of the cupped structure comprises covering the portion with a functional chemical moiety; and
   covering a portion of the ball lens with a complementary chemical material, wherein placing the ball lens in the cupped structure comprises forming an affinity interaction or a covalent bond between the functional chemical moiety on the portion of the cupped structure and the complementary chemical material on the portion of the ball lens.

10. The method of claim 1, wherein creating the lensed surface comprises rapid thermal annealing of a material to form the lensed surface on the second end of the fiber of the plurality of fibers.

11. The method of claim 1, wherein creating the lensed surface comprises reactive ion etching of a material to form the lensed surface on the second end of the fiber of the plurality of fibers.

12. The method of claim 1, wherein a first technique is employed to create the lensed surface on the second end of the fiber of the plurality of fibers, wherein a second technique is employed to create a lensed surface on a second end of a second fiber of the plurality of fibers, wherein the first technique and the second technique are different.

13. A micro-lensed fiber optic plate comprising:
   a fiber optic plate, wherein the fiber optic plate comprises a plurality of fibers arranged in parallel, wherein a first end of a fiber of the plurality of fibers has a first numerical aperture, wherein the fiber of the plurality of fibers comprises a core material running along the length of the fiber that is circumscribed by a layer of cladding material; and
   a lensed surface on a second end of the fiber of the plurality of fibers, wherein the second end is opposite the first end, wherein a lensed surface of the fiber of the plurality of fibers has a second numerical aperture, wherein the first numerical aperture and the second numerical aperture are different, wherein the lensed surface of the fiber of the plurality of fibers is registered to an optical axis of the fiber of the plurality of fibers.

14. The fiber optic plate of claim 13, wherein the lensed surface of the fiber of the plurality of fibers comprises etched material.

15. The fiber optic plate of claim 13, wherein the lensed surface of the fiber of the plurality of fibers comprises a ball lens retained with a cupped structure.

16. The fiber optic plate of claim 15, wherein a portion of the cupped structure is chemically functionalized, wherein a portion of the ball lens is covered with a complementary chemical material, wherein the covered portion of the ball lens is bonded to the chemically functionalized portion of the cupped structure by way of an affinity interaction or a covalent bond.

17. A method of forming a micro-lensed fiber optic plate comprising:
   obtaining a fiber optic plate, wherein the fiber optic plate comprises a plurality of fibers arranged in parallel, wherein a first end of a fiber of the plurality of fibers has a first numerical aperture, wherein the fiber of the plurality of fibers comprises a core material running along the length of the fiber that is circumscribed by a layer of cladding material;
   forming a cupped structure at a second end of the fiber of the plurality of fibers, wherein the second end is opposite the first end; and
   placing a ball lens in the cupped structure, wherein the ball lens is registered to an optical axis of the fiber of the plurality of fibers, in the ball lens having a second numerical aperture that is different from the first numerical aperture.

18. The method of claim 17, wherein forming the cupped structure comprises etching a portion of the core material at the second end of the fiber of the plurality of fibers to expose a portion of the cladding material, wherein the cupped structure comprises the exposed portion of the cladding material.

19. The method of claim 17, wherein forming the cupped structure comprises:
   applying a photoresist material on a face of the second end of the fiber of the plurality of fibers;
   passing light through the fiber optic plate from the first end of the fiber of the plurality of fibers to the second end of the fiber of the plurality of fibers, wherein the light chemically alters portions of the photoresist material exposed to the light, wherein the light is further configured to travel through the core material, wherein the ultraviolet light is yet further configured to not travel through the cladding material; and
   removing the altered portions of the photoresist material.

20. The method of claim 17, further comprising:
   chemically functionalizing a portion of one of the cupped structures to cover the portion of the cupped structure with a functional chemical material; and
   covering a portion of one of the ball lenses with a complementary chemical material, wherein placing the ball lens in the cupped structure comprises forming an affinity interaction or a covalent bond between the functional chemical material on the portion of the cupped structure and the complementary chemical material on the portion of the ball lens.

* * * * *